US005970477A

United States Patent [19]
Roden

[11] Patent Number: 5,970,477
[45] Date of Patent: Oct. 19, 1999

[54] METHOD AND SYSTEM FOR ALLOCATING COSTS IN A DISTRIBUTED COMPUTING NETWORK

[75] Inventor: Barbara J. Roden, Atlanta, Ga.

[73] Assignee: BellSouth Intellectual Property Management Corporation, Atlanta, Ga.

[21] Appl. No.: 08/679,965

[22] Filed: Jul. 15, 1996

[51] Int. Cl.[6] .......... G06F 7/00

[52] U.S. Cl. .......... 705/32; 709/218; 709/229; 709/219; 379/112; 379/127; 380/4

[58] Field of Search .......... 705/32; 364/514; 395/200.59–59

[56] References Cited

U.S. PATENT DOCUMENTS

| | | | |
|---|---|---|---|
| 5,717,604 | 2/1998 | Wiggins | 364/514 |
| 5,737,414 | 4/1998 | Walker et al. | 380/4 |
| 5,745,556 | 4/1998 | Ronen | 379/127 |
| 5,778,182 | 7/1998 | Cathey et al. | 395/200.49 |
| 5,815,665 | 9/1998 | Teper et al. | 395/200.59 |
| 5,864,604 | 1/1999 | Moen et al. | 379/112 |
| 5,870,550 | 2/1999 | Wesinger, Jr. et al. | 395/200.48 |

FOREIGN PATENT DOCUMENTS

| | | |
|---|---|---|
| 0192071 A2 | 8/1986 | European Pat. Off. . |
| 0765068 A2 | 3/1997 | European Pat. Off. . |
| 19535378 A1 | 3/1997 | Germany . |
| WO 95/23483 | 8/1995 | WIPO . |
| WO 95/33236 | 12/1995 | WIPO . |
| WO 96/37848 | 11/1996 | WIPO . |
| WO 97/01920 | 1/1997 | WIPO . |
| WO 97/29584 | 8/1997 | WIPO . |

*Primary Examiner*—Allen R. MacDonald
*Assistant Examiner*—Jagdish Patel
*Attorney, Agent, or Firm*—Jones & Askew, LLP

[57] ABSTRACT

A method and system for providing an end-user with Internet access and allocating a cost associated with that access among the end-user and Internet sites 18 accessed by the end-user. A supervisory program module 58, such as a "JAVA" applet, resides on an originating station 24, such as a personal computer, operated by the end-user. The supervisory program module 58 may be activated by transmitting the supervisory program module to the originating station 24 from an Internet point of presence 22 operated by a local access provider. Alternatively, a trigger may be transmitted from the point of presence 22 to the originating station 24 to activate a supervisory program module 58 already residing on the originating station 24. The supervisory program module 58 monitors the duration of connections with specific Internet sites, and transmits messages to the point of presence 22 indicating the duration of these connections. The local access provider uses the information received in these messages to allocate a cost associated with the access, such as the cost associated with using a telephone network 30, among the end-user and Internet sites accessed by the end-user. Unique keys and time stamps are used as security measures. Unique keys are random identification numbers or codes generated by the point of presence 22. Time stamps are clock readings are generated by the originating station, the point of presence, or other network components, are used as security measures.

27 Claims, 6 Drawing Sheets

METHOD AND SYSTEM FOR ALLOCATING COSTS IN A DISTRIBUTED COMPUTING NETWORK

TECHNICAL FIELD

The present invention relates to distributed computing networks such as the Internet. More specifically, the present invention is a method and system for providing an end-user with Internet access and allocating a cost associated with that access among the end-user and Internet sites accessed by the end-user.

BACKGROUND OF THE INVENTION

The information age is upon us. The proliferation of computers has brought sweeping changes in the way our society lives, works, and interacts. For businesses, the information age presents tremendous new opportunities and challenges. On-line communications unite geographically dispersed resources and disseminate complex information with ever increasing speed and efficiency. In this fast-growing market place known as cyberspace, receiving and transmitting information in a timely and cost-effective manner is of immense importance. At the heart of cyberspace lies the Internet.

Formerly a little known resource available only to the military and a small community of academics, the Internet has in recent years become a mainstream commercial communication resource. The Internet provides a real-time, paper-free, cost-effective mode of communication and resource sharing through which sellers of goods and services can reach millions of potential customers. E-mail and remote access to computer servers are currently widely used tools for reaching computer literate potential customers. But the market place of cyberspace is in its infancy. On-line teleconferencing, interactive television, video web sites, virtual reality, and myriad other technological advances are sure to develop.

The participants in the Internet are a wide variety of machines, organizations, and individuals, all able to communicate and share information. Physically, the Internet is an interconnected collection of thousands of computer networks, tens of thousands of computers, and tens of millions of individual stations operated by end-users. The Internet works because all of these computers share compatible communication protocols and addressing schemes that make e-mail, remote resource access, file transferring, and file sharing possible throughout the system.

The backbone of the Internet is a group of networks forming an international grid of high-speed, high-capacity data communication lines interconnecting a number of massive computers that serve as large-scale processing points or nodes. These backbone networks are interconnected with each other through a plurality of interconnection points known as network access points. The backbone nodes are collectively responsible for capturing and sorting incoming information, routing information to its intended destination, and forwarding data between backbone nodes.

The Internet was originally used only for academic and governmental purposes. In recent years, however, the Internet has been opened to commercial traffic—and commercial traffic has boomed. In the United States, commercial access to the Internet may be obtained at tens of thousands of hosts located throughout the country. A host is a computer connected to the Internet and configured with Internet routing software. A host may be a massive super computer, a main-frame processing machine, a minicomputer, a workstation, or even a personal computer. Hosts serve three principal functions. First, they send and receive Internet communication traffic. Second, they provide the gateway between the Internet and end-users. And third, they provide web servers that operate as repositories of information and resources that may be accessed over the Internet. For example, these web servers provide "home pages" to be visited, files to be read or downloaded, applications to be shared, and the like.

The physical structure of Internet is therefore tremendously complex, but to the end-user it appears to be a virtually seamless network in which the computer on the desk next door may be accessed as easily as that of a commercial supplier in another city, or that of university in another country. To access any Internet site, an end-user need only transmit the site's universal resource locator (URL) created in accordance with the standardized Domain Name System (DNS). The Internet hosts and nodes respond to the URL by connecting the end-user's station with the Internet site associated with the requested URL.

At present, the operator of each Internet site is responsible for paying the cost of obtaining a communication channel with the Internet. Once an end-user establishes a communication channel with the Internet, connections may be made with other Internet sites by transmitting URLs in accordance with the DNS system. An Internet site may therefore be established by providing a host and obtaining a communication channel between that host and the Internet.

Although commercial users must now pay a fee to use the Internet, the Internet is immensely popular with commercial users and individuals, at least in part, because it is very cost effective. At present, each commercial user typically pays the cost of physically obtaining a connection to the Internet, plus a relatively modest monthly Internet connection fee based on the capacity of the connection and in some cases the actual data transfer volume. In general, no connect-time-based, destination-based, or other incremental charges are currently imposed for browsing, e-mail, and resource sharing. Thus, a dedicated connection to the Internet effectively serves as a flat-rate international browsing, messaging, and resource sharing service.

An Internet site may be connected to the Internet through a wide range of physical communication channels providing various levels of information carrying capacity. The minimum service available that gives the Internet site access to the full array of Internet services 24 hours-a-day is a single "dial-up" Internet communication channel typically costing about $15–30 per-month. Higher capacity communication channels are available at higher cost. For example, optical fiber, wireless, and leased telephone lines ranging from 56 kilo-bits-per-second to 1.544 mega-bits-per-second (T1) are typical options available to an Internet site. Internet access charges for these communication channels at present cost roughly $500–5,000 per month. In addition to these access charges, the operator of an Internet site must also pay the cost of obtaining a physical communication channel with the Internet.

Many Internet sites are operated by commercial suppliers that sell products and services. These commercial suppliers may use the Internet to cost-effectively communicate with existing and prospective consumers. To a commercial supplier, the cost of maintaining an Internet site is a cost of doing business, much like postage, electricity, and advertising. Indeed, the Internet may be one of the most cost-effective marketing resources available to a commercial entity.

Other Internet sites are points of presence operated by local access providers that, in turn, provide Internet access to millions of end-user Internet sites. Obtaining access through a local access provider is currently the least expensive way for an individual end-user to access the Internet. These points of presence therefore operate as gateways between the Internet sites of commercial suppliers and millions of end-users. A local access provider recovers the cost of its Internet communication channel and earns its profits through Internet access fees charged to its customers. For example, an local access provider may charge an end-user a flat rate of $25 per-month, or $5 per-month plus 5 cents per-connect-minute.

Between an individual end-user and a local access provider's point of presence lies a communications network, such as a telephone network, a cable television network, a wireless communications network, or the like. This communications network is typically operated by a for-profit enterprise. An end-user therefore pays a cost for using the communications network. In the United States, most homes and businesses are already connected to a telephone network. These telephone networks are therefore convenient options for end-users desiring communication channels with the Internet. Other communications networks, however, may equivalently be used to provide Internet access.

The economics of using a communications network, particularly the telephone network, is therefore an important factor in the operation of the Internet as a commercial resource. For an end-user lucky enough to have a local access provider's point of presence located within the same telephone exchange area, the Internet is only a local telephone call away. For other less fortunate end-users, long-distance telephone charges are incurred. For these end-users, even moderate Internet use of a few hours a week can result in significant long-distance telephone charges.

These long-distance telephone charges confer a significant competitive advantage on a local access provider having a point of presence in a particular telephone exchange area. To compete effectively within that local exchange area, another local access provider would have to locate a point of presence within that telephone exchange area. But locating a separate point of presence in every telephone exchange area would avoid economies of scale that could be enjoyed by providing a centralized point of presence. Moreover, it may be advantageous to locate a centralized point of presence near an Internet interface to minimize the cost of obtaining a physical communication channel between the point of presence and the Internet.

A local access provider can address this long-distance telephone charge problem by purchasing a nation-wide toll-free telephone service from a long-distance carrier. The local access provider can then locate its point of presence in an advantageous location from a physical connection standpoint, and allow end-users to obtain toll-free telephone connections with the point of presence. The cost of the toll-free telephone service is typically rolled into the local access provider's monthly access charges. Virtually any end-user in the United States with telephone service may therefore obtain Internet access by paying a local access provider a negotiated rate for Internet access.

At present, this "all or nothing" option, wherein either an end-user or a third party pays the entire cost of providing the end-user with Internet access, is the only cost-shifting option available. A more flexible allocation methodology for costs associated with Internet access is not currently available. From the commercial supplier's standpoint, this Internet access paradigm presents a significant drawback. Namely, the Internet cannot be used to reach a potential customer that is not willing to pay at least the cost of obtaining Internet access via a local access provider. Many potential customers users therefore remain unconnected, and there is no effective way for a commercial supplier to use the Internet to reach these unconnected potential customers.

This drawback limits the effectiveness of the Internet as a marketing tool because, in some cases, a commercial supplier may be willing to bear the entire cost of communicating with a particular end-user via the Internet. For example, a commercial supplier is typically responsible for marketing costs associated with commercial television advertisements, direct mail advertisements, billboard advertisements, and the like. This commercial supplier may also be willing to pay the entire cost associated with providing a particular end-user with access to its Internet site. This commercial supplier may not, however, be willing to pay the cost associated with providing the end-user with access to other Internet sites, such as those operated by its competitors.

Other Internet site operators may also be willing to bear the entire cost of providing a particular end-user with access to a specific Internet site. A city or county, for example, may wish to provide residents with free access to a web server providing information regarding road closings, weather conditions, emergency services, garbage pick-up, and the like. Similarly, a church may wish to provide parishioners with free access to a web server providing information regarding devotional services, social functions, and the like. Many organizations could similarly make effective use of a selective supplier-paid Internet access regime.

More generally, many advantageous cost allocation methodologies, such as split-cost allocations, time-based allocations, and destination-based allocations would be possible if an end-user's cost of Internet access could be allocated based on various allocation parameters including Internet sites accessed. Thus, there is a need for flexible methods and systems for allocating costs associated with Internet access.

SUMMARY OF THE INVENTION

The present invention meets the above-described needs by providing a method and system for providing an end-user with Internet access and allocating a cost associated with that access among the end-user and Internet sites accessed by the end-user. More specifically, the present invention provides a supervisory program module that resides on an originating station operated by the end-user. The supervisory program module monitors the duration of connections with specific Internet sites, and transmits messages to an Internet point of presence indicating the duration of these connections. The local access provider uses the information received in these messages to allocate a cost associated with the access among the end-user and the Internet sites accessed by the end-user. Unique keys including random identification numbers or codes generated by the point of presence, and time stamps such as clock readings generated by the originating station, the point of presence, or other network components, are used as security measures.

Generally described, the present invention is a method for providing an originating station, such as a personal computer, with access to a distributed computing network, such as the Internet. A communication, such as a telephone call, including a request for access to the distributed computing network is received from the originating station via a communications network, such as a telephone network. The communication is routed to provide access to the distributed computing network, including a connection between the originating station and a monitored network site on the distributed computing network, such as an Internet site web server. The duration of the communication and the duration of the connection with the monitored network site are determined, and a cost associated with the communication is allocated between a first account associated with the monitored network site and a second account associated with the originating station. The allocation is based on the duration of the communication and the duration of the connection between the originating station and the monitored network site.

The duration of the connection between the end-user station and the monitored network site is determined by activating a supervisory program, such as a "JAVA" applet, residing on the originating station. The supervisory program module is activated by transmitting the supervisory program module to the originating station. Alternatively, a trigger transmitted to the originating station activates a supervisory program module already residing on the originating station. The supervisory program module is operative to transmit a message indicating the duration of the connection.

A directory, such as a list of Internet sites in a "free zone," may also be transmitted to the originating station. The directory includes an item corresponding to the monitored network site. The item is displayed on a display screen coupled to the originating station, and the originating station is connected with the monitored network site in response to a user command selecting the item.

A unique key, such as a randomly generated number, may be used as a security device. The key is generated and transmitted to the originating station along with the supervisory program module. A cost associated with the communication, such as a cost of using the telephone network, is allocated between the first account associated with the monitored network site and the second account associated with the originating station only if the message transmitted by the supervisory program module includes the key.

Time stamps, such as clock readings, may also used to provide a further measure of security. The supervisory program module transmits a first message including a first start time stamp indicating the beginning of the connection between the originating station and the monitored network site. In response to receiving the first message, a second start time stamp is generated. A second message including a first stop time stamp indicating the end of the connection between the originating station and the monitored network site is received. In response to receiving the second message, a second stop time stamp is generated. A first monitored duration based on the difference between the first stop time stamp and the first start time stamp is computed. Similarly, a second monitored duration based on the difference between the second stop time stamp and the second start time stamp is computed. The cost associated with the communication is allocated between the first and second accounts only if the first monitored duration is approximately equal to the second monitored duration.

The present invention also provides a computer-readable medium storing a supervisory program module operable for monitoring access to a distributed computing network. The supervisory program module includes instructions that may be executed by the originating station. According to these instructions, a directory, including an item corresponding to a monitored network site on the distributed computing network, is displayed on a display device coupled to the originating station. A user command selecting the item is detected, and the duration of a connection between the originating station and the selected network site is determined. A message is then transmitted indicating the duration of the connection.

The present invention also provides a point of presence including a receiver for receiving a communication from an originating station. A terminal server/router, coupled to the receiver, routes the communication to provide the originating station with access to a distributed computing network. This access includes a connection between the originating station and a monitored network site on the distributed computing network. An authentication and accounting server, coupled to the terminal server/router, determines the duration of the communication. A credit server, coupled to the terminal server/router, determines the duration of the connection between the originating and the monitored network site. A billing system, coupled to the authentication and accounting server and to the credit server, allocates a cost associated with the communication between a first account associated with the monitored network site and a second account associated with the originating station. This cost allocation is based on the duration of the communication and the duration of the connection.

The present invention therefore provides a method and system for providing an end-user with Internet access and allocating a cost associated with that access among the end-user and Internet sites accessed by the end-user. That the present invention improves over the drawbacks of the prior art and provides the advantages described herein will become apparent from the following detailed description of the preferred embodiment and the appended drawings and claims.

DETAILED DESCRIPTION

Figure 1:
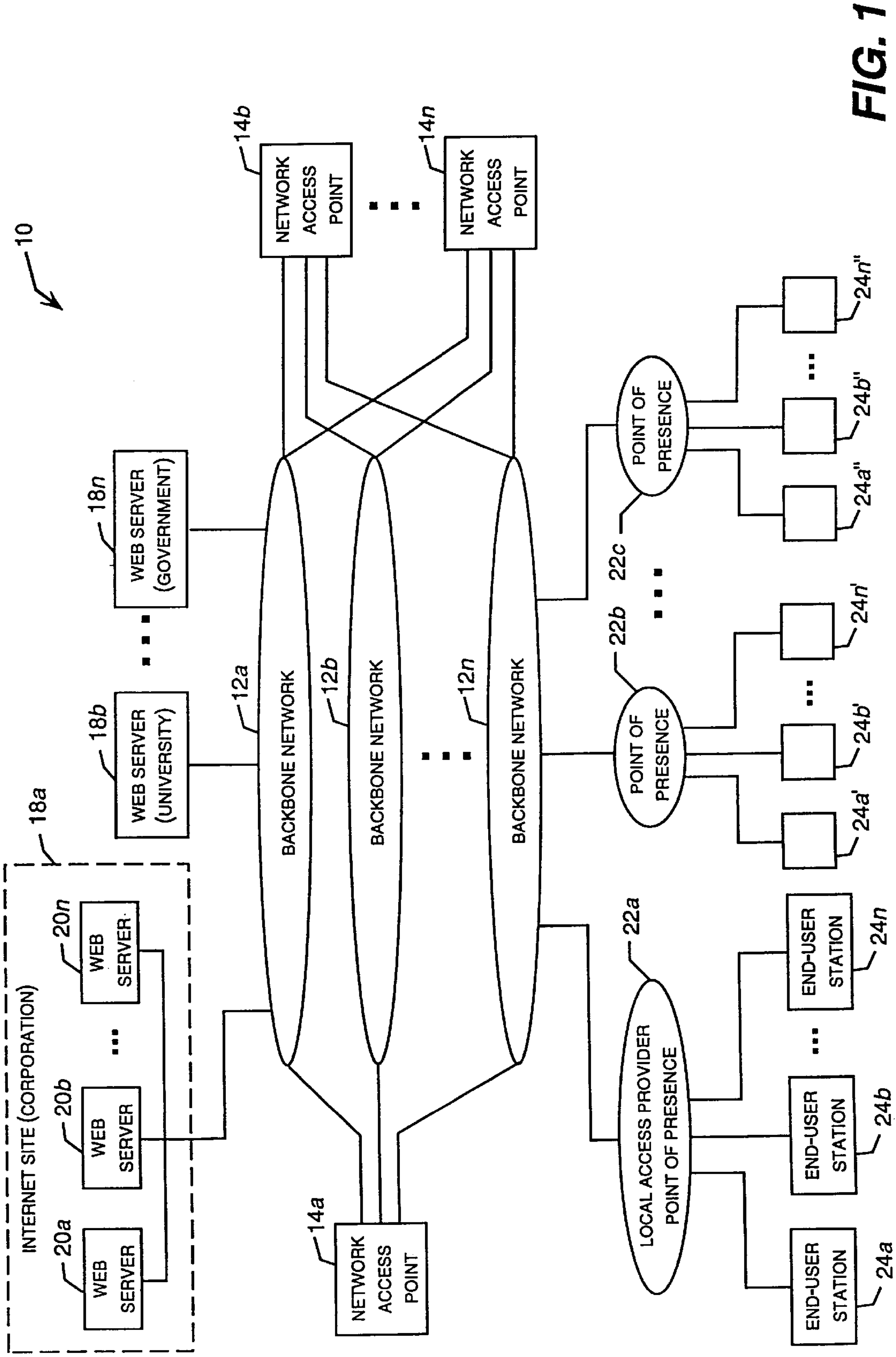
FIG. 1 is a functional block diagram of a distributed computing network representing the operating environment of the preferred embodiment of the present invention.

The embodiments of the present invention provide an end-user with Internet access and allocating a cost associated with that access among the end-user and Internet sites accessed by the end-user. A supervisory program module, such as a "JAVA" applet, resides on an originating station, such as a personal computer, operated by the end-user. The supervisory program module may be activated by transmitting the supervisory program module to the originating station from an Internet point of presence operated by a local access provider. Alternatively, a trigger may be transmitted from the point of presence to the originating station to activate a supervisory program module already residing on the originating station. The supervisory program module monitors the duration of connections with specific Internet sites, and transmits messages to the point of presence indicating the duration of these connections. The local access provider uses the information received in these messages to allocate a cost associated with the access, such as the cost associated with using a telephone network, among the end-user and Internet sites accessed by the end-user. Unique keys and time stamps are used as security measures. Unique keys are random identification numbers or codes generated by the point of presence. Time stamps, or clock readings, are generated by the originating station, the point of presence, or other network components, are used as security measures.

The following detailed description is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained in the form of a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms are associated with physical quantities used in computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hardwired logic or programs stored in nonvolatile memory, such as read only memory.

DESCRIPTION OF THE OPERATING ENVIRONMENT

Referring now to the drawings, in which like numerals indicate like elements throughout the several figures, FIG. 1 is a is functional block diagram of the Internet 10, a distributed computing network that provides the operating environment for the preferred embodiment of the present invention. The Internet 10 includes a plurality of backbone networks 12*a* through 12*n*. These backbone networks form an international grid of high-speed, high-capacity data communication lines interconnecting a number of massive computers that serve as large-scale processing points or nodes. The backbone networks 12 are interconnected with each other through a plurality of network access points 14*a* through 14*n*. These network access points are interfaces through which information is communicated from one backbone network to another. The configuration and operation of the Internet backbone is well known to those skilled in the art and will not be further described herein.

The participants in the Internet 10 are a wide variety of machines, organizations, and individuals, all able to communicate and share information. For example, the Internet 10 includes a plurality of Internet sites 18*a* through 18*n*. These Internet sites are generally operated by corporations, universities, and governmental organizations. Each Internet site may include one or more repositories of information and resources that may be accessed over the Internet. Each Internet site, as represented by the Internet site 18*a*, may include a plurality of web servers 20*a* through 20*n*. Each of these web servers may provide "home pages" to be visited, files to be read or downloaded, applications to be shared, and the like.

The Internet 10 also includes a plurality of points of presence 22*a* through 22*n* that are operated by local access providers. These local access providers are in the business of providing Internet access to end-user stations. As shown in FIG. 1, the point of presence 22*a* provides Internet access to end-user stations 24*a* through 24*n*, the point of presence 22*b* provides Internet access to end-user stations 24*a*' through 24*n*', etc. All together, the points of presence 22 can provide Internet access to numerous end-user stations 24. Each point of presence 22, and each end-user 24, may, but need not, provide home pages for access by others on the Internet 10.

DESCRIPTION OF THE EMBODIMENTS

Figure 2:
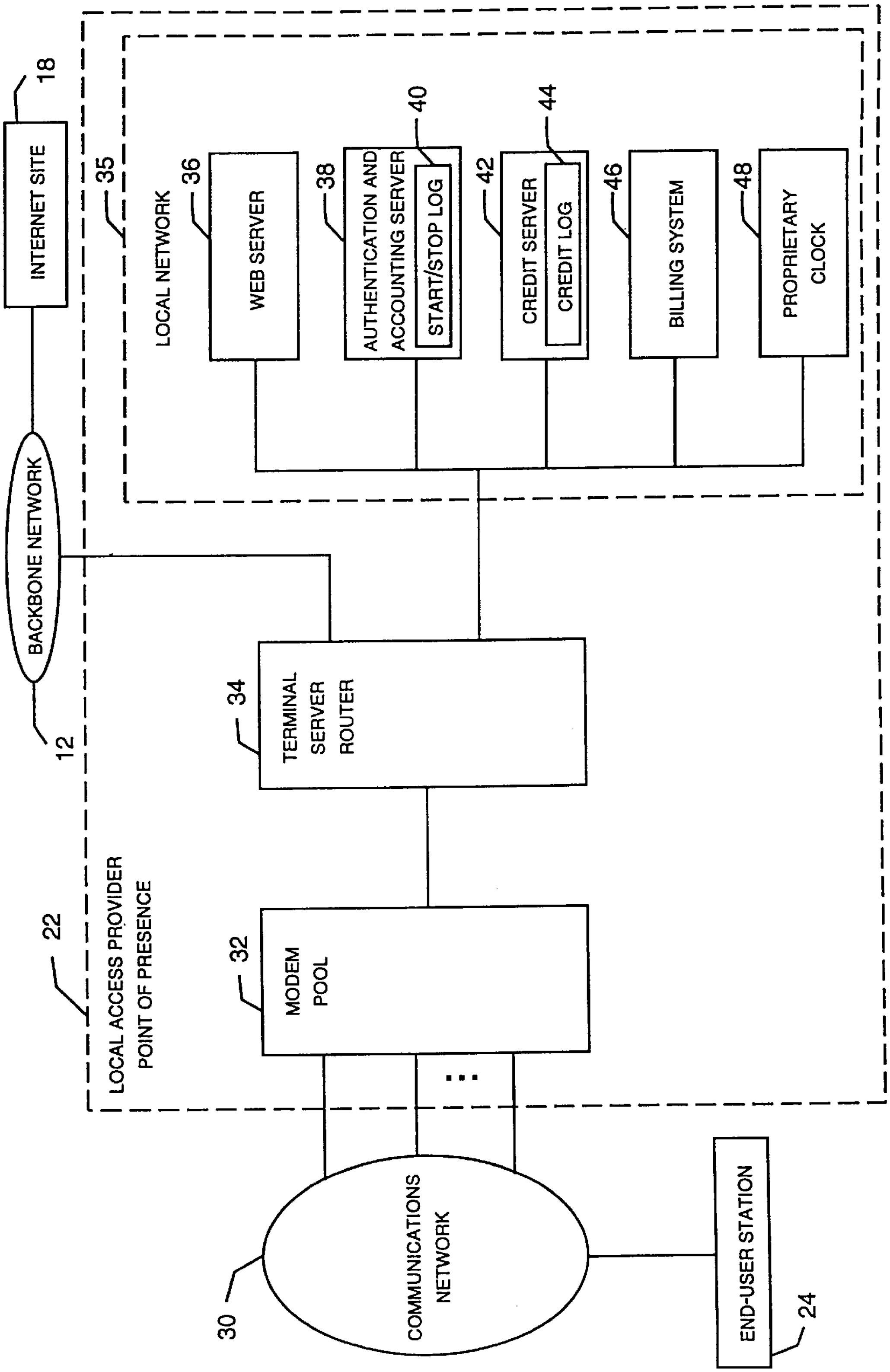
FIG. 2 is a functional block diagram of a point of presence for providing end-users with access to a distributed computing network, as illustrated in FIG. 1.

FIG. 2 is a functional block diagram of a point of presence 22 for providing an end-user 24 with access to the Internet 10. The end user 24 communicates with the point of presence 22 via a communications network 30, such as a telephone network, a cable television network, a wireless communications network, or the like. The end-user 24 typically pays a cost for using the communications network 30. The embodiments of the present invention provide flexible methods and systems for allocating this cost. Specifically, the cost associated with using the communications network 30 to provide a connection between the end-user station 24 and an Internet site 18 may be allocated between a first account associated with the end user station 24 and a second account associated with the accessed Internet site 18.

Computing this allocation requires information regarding the connection between the end-user station 24 and the Internet site 18. A wide variety of factors may be used in this allocation, but the preferred allocation parameter is the connect time between the end-user station 24 and the Internet site 18. It is therefore necessary to determine the duration of the connection between the end-user station 24 and the Internet site 18. The operator of the accessed Internet site 18 may then be allocated a cost associated with the use of the communications network 30 based on the duration of the connection between the accessing end-user station 24 and the Internet site 18. This charge for using the communication network 30, currently paid by the end-user 24 or the operator of the point of presence 22 on behalf of the end-user 24, may therefore be "reversed" to the operator of the accessed Internet site 18.

Although the disclosed embodiments of the present invention operate in the manner described above, it should be understood that many other embodiments may be constructed in accordance with the teachings of the present invention. For example, an equivalent of the supervisory program module described herein could reside in a platform, such as a proxy server, that is electrically located between the end-user station 24 and the point of presence 22. The present invention is therefore broadly understood as a method and system for allocating a cost associated with providing a particular originating station with access to a distributed computing network based at least in part on the network sites accessed by the end-user. The originating station may be any device operable for accessing the distributed computing network. The distributed computing network may be any network accessible to the originating station. The allocated cost may be any cost associated with the access, and the allocation may be based on any combination of allocation parameters.

In particular, it should be understood that costs other than the cost associated with using the communications network 30 may be allocated. For example, the operator of an accessed Internet site 18 may charge the accessing end-user station 24 a fee for accessing the Internet site 18. This cost may be allocated to an account associated with the end-user station 24, collected by the operator of the point of presence 22, and paid to the operator of the Internet site 18. Alternatively, the operator of the accessed Internet site 18 may sell goods or services to the operator of the end-user station 24 (or vice-versa). The cost of these goods or services may be allocated to an account associated with the end-user station 24 (or the accessed Internet site 18), collected by the operator of the point of presence 22, and paid to the operator of the Internet site 18 (or the end-user station 24).

In addition, the allocation methodology may consider other allocation parameters, such as the distance between the originating station and accessed site, the time of day, the data transfer volume, resources utilized, applicable membership status, or any other measurable parameter. For example, other embodiments of the present invention may use more elaborate cost allocation methodologies, such as time-based rates, capacity-based rates, distance-based rates, usage-based rates, content-based rates, and the like. As one alternative, the operator of an accessed site 18 could be allocated the cost of the first five minutes of access, and the accessing end-user 24 allocated the remainder. As another alternative, the operator of an accessed site 18 could be allocated a relatively small cost during peak usage hours and a larger cost during off-peak hours to encourage efficient usage patterns of its Internet resources.

Furthermore, a third party may be allocated a portion of a cost associated with providing a particular end-user with access to particular Internet sites. For example, a third party, such as a parent, might pay for a child's Internet access as a gift while the child is away at school. To do so, the parent establishes an account with the child's local access provider, and gives the local access provider a list of Internet sites for which the parent will accept "reversed" Internet access charges. The cost of providing the child with access to the Internet sites on the list, and only those on the list, is then allocated to the parent's account. It will therefore be appreciated that a wide variety of Internet-based commercial transactions may be facilitated in accordance with the teachings of the present invention.

Referring still to FIG. 2, the local access provider's point of presence 22 preferably includes a modem pool 32, a terminal server/router 34, and a local computing network 35. The local network 35 includes a web server 36, an authentication and accounting server 38 including a start/stop log 40, a credit server 42 including a credit log 44, and a billing system 46. The web server 36, which is maintained by the local access provider, provides a generally accessible Internet site similar to the Internet site 18. The start/stop log 40 documents each end-user's connect time with the modem pool 32. The credit log 44 documents each end-user's allocation parameters, preferably the connect time with a predefined list of free Internet sites. The start/stop log 40 and the credit log 44 are periodically downloaded to the billing system 46. The billing system 46 allocates the costs associated with each end-user's communications in accordance with the appropriate allocation methodologies, and renders the resulting invoices.

It should be understood that, although the disclosed embodiments of the present invention include a separate piece of equipment corresponding to each enumerated component of the point of presence 22 shown in FIG. 2, each component could equivalently be combined with other components into a single piece of equipment, or distributed among multiple pieces of equipment. Thus, any configuration of equipment that performs the functions described herein should be considered within the scope of the present invention.

In the disclosed embodiments of the present invention, the local network 35 may be any of a variety of commercially available network architectures such as a local area network (LAN), a wide area network (WAN), Ethernet, Appletalk, or the like. The computing stations of the local network 35 may be any of a variety of commercially available computing stations. For example, the web server 36, the authentication and accounting server 38, the credit server 42, and the billing system 46 may each be a "SUN" Sparc, "HP" series K, or "IBM" RS6000 computing system.

The modem pool 32 is operable for simultaneously maintaining a large number of communications with end-user stations 24 via the communications network 30. The modem pool 32 may be any of a variety commercially available modem pools, such as those manufactured by "US ROBOTICS" or "CISCO" having about 48 input lines. The authentication and accounting server 38 receives a "start_log" message whenever an end-user 24 successfully logs into the terminal server/router 34. The authentication and accounting server 38 also receives a "stop_log" message whenever an end-user 24 discontinues a communication with the point of presence 22. These start_log and stop_log messages include the Internet Protocol (IP) address and user name associated with the logging-in or logging-out end-user station. The authentication and accounting server 38 stores the contents of the start_log and stop_log messages in the start/stop log 40 to provide a record of each end-user's connect time with the point of presence 22.

The modem pool 32 receives the incoming communication signals from the end-users 24 and provides the communication signals to the terminal server/router 34. The terminal server/router 34 routes these communications for connection with various Internet sites 18 in accordance with URLs input by the end-users 24. All end-users connected with the terminal server/router 34 generally have unrestricted access to the Internet 10. Therefore, only authorized end-users—generally those who input valid user account and personal password or identification (ID) numbers—are connected with the terminal server/router 34. Unauthorized end-users who connect with the modem pool 32 preferably receive an informational screen display and are subsequently disconnected. In other embodiments of the present invention, unauthorized end-users may be given limited access to the web server 36 and certain Internet sites.

The terminal server/router 34 may be any of a variety commercially available terminal server/routers, such as those manufactured by "ASCEND" or "CISCO." These devices do not presently have the capability of monitoring the actual duration of a connection between a particular end-user 24 and a particular Internet site 18. Rather, only the actual connect time with the point of presence 22, and the total number of bytes transferred during a session, are presently monitored by the terminal server/router 34. In addition, the web server 36 monitors the time required to respond to each URL request, and the time required to download data to the end user station 24. The portion of the actual connect time that the end-user spends reading information and performing other tasks, however, is not presently monitored on a site-by-site basis.

Figure 3:
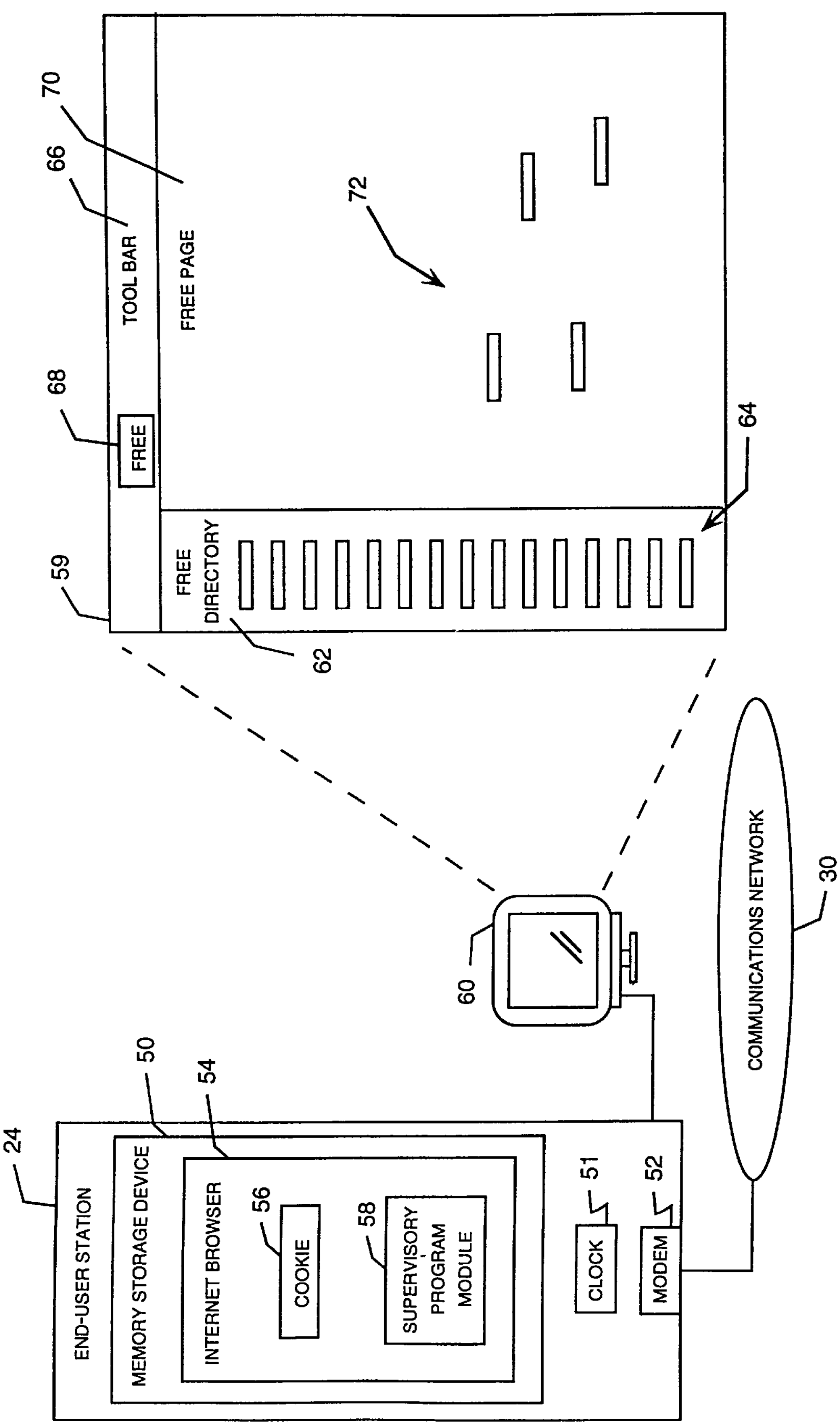
FIG. 3 is a functional block diagram of an end-user station for obtaining access to a distributed computing network.

FIG. 3 is a functional block diagram of an end-user station 24 for obtaining access to a distributed computing network such as the Internet 10. Referring to FIGS. 2 and 3, the end-user station 24 may be any of a variety of commercially available computing stations, such as "APPLE," "IBM," or "IBM"-compatible personal computers. The end-user station 24 includes a memory storage device 50, a clock 51, and a modem 52 for communicating with the point of presence 22 via the communications network 30. The memory storage device 50 of end-user station 24 also includes Internet browser software 54, such as "NETSCAPE" browser software or its equivalent.

The Internet browser software 54 within the memory storage device 50 supports a cookie 56 that maintains data at the end-user station 24. When an end-user station initially connects with the modem pool 32, the end-user is prompted for valid user account and ID numbers. Upon a valid log in, the credit server 42 may transmit the valid user account and ID numbers to the end-user station 24 for storage in the cookie 56. The credit server 42 then automatically checks the cookie 56 when the modem pool 32 receives a subsequent communication from the end-user station 24. If the cookie 56 contains the valid account and ID numbers, the supervisory program module 58 is engaged, and the communication is routed to the terminal server/router 34. If the cookie 56 does not contains the valid account and ID numbers, the end-user is again prompted for valid user account ID numbers.

The site-by-site monitoring operation of the preferred embodiment is performed by a supervisory program module 58 that resides on the end-user station 24. The supervisory program module 58 may be a software module, such as a "JAVA" applet. "JAVA" is a programming language developed by Sun Microsystems. A "JAVA" applet is a portable capsule of object oriented architecture-neutral software code and related data. A "JAVA" applet is a flexible tool that may be programmed to perform a wide variety of functions. A customized "JAVA" applet may, but need not, be maintained for each end-user station 24. In the preferred embodiment of the present invention, administrative complexity is minimized by utilizing a single "JAVA" applet or a small set of "JAVA" applets to provide service to tens of thousands of end-users stations.

The supervisory program module 58 preferably operates in conjunction with a frame 59 that is displayed on a display screen 60 associated with the end-user station 24. A frame is a standard feature of the Internet browser software 54, such as the "NETSCAPE" browser, that allows the display screen to be divided into sections. The preferred frame 59 includes three sections: a free directory 62 including "hot links" 64 that correspond to Internet sites in a "free zone," a tool bar 66 including a free button 68, and a free page 70 that may include "hot links" 72 that correspond to Internet sites in a "pay zone" or in the free zone.

The hot links 64 and 72 are items displayed on the screen 60, such as text or icons that are associated with "HYPERTEXT." These "HYPERTEXT" items may be selected by an end-user to access Internet sites. Selecting a hot link automatically causes a URL request associated with an Internet site to be transmitted from the end-user station 24 to the point of presence 22. The terminal server/router 34 responds to the URL request by routing the communication to the Internet site associated with the requested URL. Selecting a series of these hot links allows the end-user to easily "surf" the Internet.

The frame 59 thus divides the universe of Internet sites into two zones, the free zone and the pay zone. The cost of accessing an Internet site in the free zone is allocated to an account associated with the operator of the accessed Internet site, and the cost of accessing an Internet site in the pay zone is allocated to an account associated with the end-user. For the preferred embodiment, the free directory 62 is displayed in a column on the left side of the display screen 60, the tool bar 66 is displayed along the top or bottom of the display screen, and the free page 70 occupies the remaining area of the display screen. It should be understood that the scope of the present invention is not limited to the disclosed frame 59.

There are at least two ways for the end-user to enter the free zone. First, the end-user may select the free button 68 within the tool bar 66. In response, the free directory 62 appears in a column on the left side of the display screen 60, and the home page of the web server 36 is displayed within the free page section 70 of the frame 59. If the end-user then selects a hot link 64 in the free directory 62, the home page of the selected Internet site appears in the free page section 70, while the free directory 62 continues to appear on the left side of the display screen 60. The frame 59 thus allows the end-user to surf among the Internet sites within the free zone by selecting the hot links 64 of the free directory 62. It should be understood that the scope of the present invention is not limited to the disclosed implementation for entering the free zone.

Alternatively, the end-user may access an Internet site within the free zone without first accessing the home page of the web server 36 by directly transmitting a URL associated with an Internet site within the free zone. In this case, the home page of the selected Internet site appears in the free page section 70, and the free directory 62 appears on the left side of the display screen 60. The end-user may then surf among the Internet sites within the free zone by selecting the hot links 64 of the free directory 62.

The end-user may also access an Internet site in the pay zone by directly transmitting a URL associated with an Internet site within the pay zone, or by selecting one of the hot links 72 associated with an Internet site within the pay zone. In response, the free directory 62 is deleted, and the home page of the selected Internet site is displayed on the display screen 60. The tool bar 66 remains on the display screen 60. The end-user may return to the free zone by selecting the free button 68, or by surfing directly to one of the Internet sites within the free zone.

The supervisory program module 58 monitors Internet activity conducted by the end-user station 24 and transmits messages to the credit server 42. More specifically, the supervisory program module 58 monitors the end-user's access to an Internet site 18 in the free zone by transmitting a "start_free" message to the credit server 42 when the end-user station 24 transmits a URL request for the Internet site 18. The supervisory program module 58 later transmits a "stop_free" message upon the occurrence of a predefined event, typically transmission of a URL request for another Internet site. These start_free and stop_free messages each include "time stamps" or clock readings generated by the supervisory program module 58 based on the clock 51 controlled by the end-user station 24, along with the IP address and user name associated with the end-user station 24 and the URL or IP address of the accessed Internet site 18. The credit server 42 stores the contents of the start_free and stop_free messages in the credit log 44 to provide a record of the end-user's connect time with the Internet site 18. When the credit log 44 is downloaded to the billing system 46, the end-user's connect time with the Internet site 18 is computed as the difference between the time stamp of the stop_free message less the time stamp of the start_free message.

There are many possible options for monitoring an end-user's Internet activity. For example, the supervisory program module 58 may monitor the free zone, but not each Internet site within the free zone individually. In this case, the supervisory program module 58 only transmits a start_free or stop_free message when the end-user enters or exits the free zone. This option might be used, for example, if the operator of each Internet site within the free zone is charged a flat-rate so that site-by-site connect-time-based allocation of costs is not necessary.

Alternatively, the supervisory program module 58 may monitor the connect time between each end-user station and each free Internet site individually. In this case, the supervisory program module 58 transmits a start_free or stop_free message when the end-user enters or exits each free Internet site. This option allows site-by-site connect-time-based allocation of costs. In another alternative, the supervisory program module 58 may monitor each free and each pay Internet site individually. As discussed previously, many allocation parameters other than connect-time may also be monitored such as individual commands entered, files accessed, resources used, files transferred, goods or services purchased or sold, etc.

In addition to these alternatives, the disclosed embodiments of the present invention include various methods for activating the supervisory program module 58. In a first embodiment, a supervisory program module 58 that remains resident on the end-user station 24 is activated by a trigger transmitted from the point of presence 22. The trigger is a command sequence that activates a supervisory program module 58 residing on the end-user station 24. The trigger and the frame 59, including the free directory 62, are transmitted to the end-user station 24 whenever the end-user accesses an Internet site within the free zone or selects the free button 68 on the tool bar 66. The frame 59 including the free directory 62 is deleted, and the supervisory program module 58 is closed, whenever the end-user accesses an Internet site within the pay zone, or when the communication is disconnected. The supervisory program module 58, however, is not deleted from the memory storage device 50 of the end-user station 24.

In a second embodiment, a supervisory program module 58 only remains resident on an end-user station 24 while the end-user is connected with the web server 36 or an Internet site within the free zone. In this embodiment, the supervisory program module 58 is activated by transmitting the supervisory program module 58 from the web server 36 to the end-user station 24 in response to a URL request for an Internet site within the free zone, or selection of the free button 68. The supervisory program module 58 is preferably embedded within and transmitted with the frame 59 including the free directory 62. The frame 59 and the supervisory program module 58 are deleted from the memory storage device 50 of the end-user station 24 whenever the end user accesses an Internet site within the pay zone, or when the communication is disconnected.

The disclosed embodiments of the present invention also include various methods for providing security and authenticating messages received by the credit server 42. A first security measure includes a "key" generated by the web server 36. A key is a unique identification number or code assigned to a communication received from an end-user station 24. The key is transmitted to the end-user station 24 and stored in connection with the supervisory program module 58. The supervisory program module 58 includes the key in subsequent messages transmitted back to the credit server 42. If the correct key is not included in a message, the end-user may be allocated the cost associated with the communication. A key may equivalently be assigned to a particular connection between an end-user station 24 and an Internet site 18, a particular message, or some other parameter in accordance with the allocation methodology in effect.

Another security measure involves time stamps in addition to those generated by the supervisory program module 58, which were discussed previously. For example, the authentication and accounting server 38 generates a time stamp whenever a start_log or a stop_log message is received. These authentication and accounting server time stamps are recorded in the start/stop log 40. The credit server 42 also generates a time stamp each time a start_free or stop_free message is received. These credit server time stamps are recorded in the credit log 44. When the start/stop log 40 and the credit log 44 are downloaded to the billing system 46, the credit server time stamps are compared with the authentication and accounting server time stamps to verify that the messages received by the credit server 42 from a particular end-user station 24 were received at a time when the end-user station 24 was logged into the authentication and accounting server 38.

As a further security measure, the credit server 42 generates time stamps that track the end-user station time stamps. The end-user time stamps are included in messages received from the end-user station 24 and include reading of the clock 51, which is controlled by the end-user station 24. The credit server time stamps include clock reading of a proprietary clock 48, i.e., a clock controlled by the point of presence 22. Dual time stamps including clock readings generated both the end-user station 24 and the point of presence 22 are preferred, as the relationship between the two sets of time stamps may be used to define a unique signature identifying a specific end-user station.

For example, the supervisory program module 58 transmits an end-user station time stamp along with each start_free and stop_free message. The supervisory program module 58 may also transmit end-user station time stamps periodically in status messages while the end-user station 24 is connected with the point of presence 22. Upon receiving a message from the end-user station 24, the credit server 42 generates a second time stamp based on the proprietary clock 48 controlled by the point of presence 22.

These dual time stamps generated by the end-user station 24 and the credit server 42 may be subsequently analyzed to authenticate messages and detect tampering by end-users. In particular, several types of potentially fraudulent events may be detected including (1) end-user disconnection without logging out, for example by powering-off or line-dropping, (2) end-user simultaneous operation of multiple supervisory program modules, (3) end-user messages including contrived time stamps, keys, URLs, or IP addresses (4) entries appearing in the credit log without valid end-user station and credit server time stamps, (5) manipulation of an end-user station clock 51 or the proprietary clock 48. It will be appreciated that many other potentially fraudulent events may detected through analysis of the keys and time stamps described herein.

DESCRIPTION OF THE OPERATION OF THE DISCLOSED EMBODIMENTS

Figure 4:
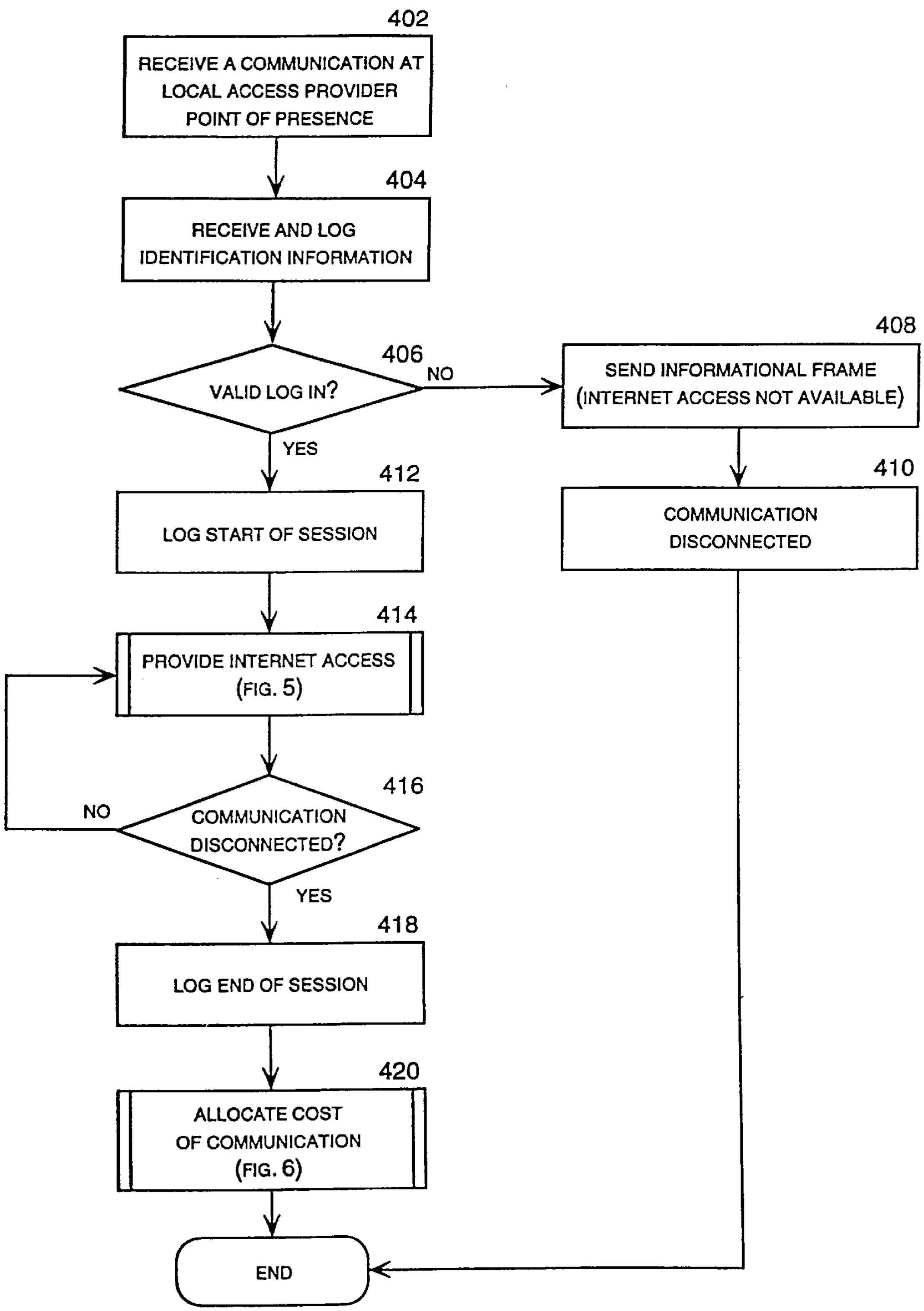
FIG. 4 is a logic flow diagram illustrating a method for providing an end-user with Internet access and allocating a cost associated with that access among the end-user and Internet sites accessed by the end-user in accordance with the preferred embodiment of the present invention.

FIG. 4 is a logic flow diagram illustrating a method for providing an end-user with Internet access and allocating a cost associated with that access among the end-user and Internet sites accessed by the end-user. Turning now to FIG. 4, and also referring to FIGS. 2 and 3, in step 402 a communication originating at an end-user station 24 is received at the modem pool 32 of the point of presence 22 operated by a local access provider. The communication received from the end-user station 24 is held at the modem pool 32 while the end-user attempts to log into the authentication and accounting server 38.

The end-user logs into the authentication and accounting server 38 in step 404. In decision step 406, it is determined whether the end-user completed a valid log in. If the end-user did not complete a valid log in, the "NO" branch is followed from step 406 to step 408 in which an informational frame is transmitted to the end-user station 24 for display on the display screen 60. The informational frame may explain that Internet access is not available because the end-user did not complete a valid log in. Other information may be displayed or limited access may be provided to the web server 36 or certain Internet sites. Eventually, the communication between the end-user station 24 and the modem pool 32 is disconnected in step 410.

If it is determined in step 406 that the end-user completed a valid log in, the "YES" branch is followed from step 406 to step 412 in which the authentication and accounting server 38 generates a start_log message. The contents of the start_log message, along with a time stamp generated by the authentication and accounting server 38, are stored in the start/stop log 40. The communication is then routed from the modem pool 32 to the terminal server/router 34. In routine 414, the end-user station 24 is provided with access to the Internet 10. Routine 414 is described with more particularity with respect to FIG. 5 below.

In decision step 416, it is determined whether the communication between the end-user station 24 and the point of presence 22 has been disconnected. If not, the "NO" branch loops back to step 414 and the end-user station 24 is provided access to the Internet 10 until the communication is disconnected, as determined in decision step 416. Upon disconnection, the "YES" branch is followed from step 416 to step 418 in which the authentication and accounting server 38 generates a stop_log message. The contents of the stop_log message, along with a time stamp generated by the authentication and accounting server 38, are stored in the start/stop log 40. A cost associated with the communication between the end-user station 24 and the modem pool 32 is subsequently allocated in routine 420. Routine 420 is described with more particularity with respect to FIG. 6 below.

Figure 5:
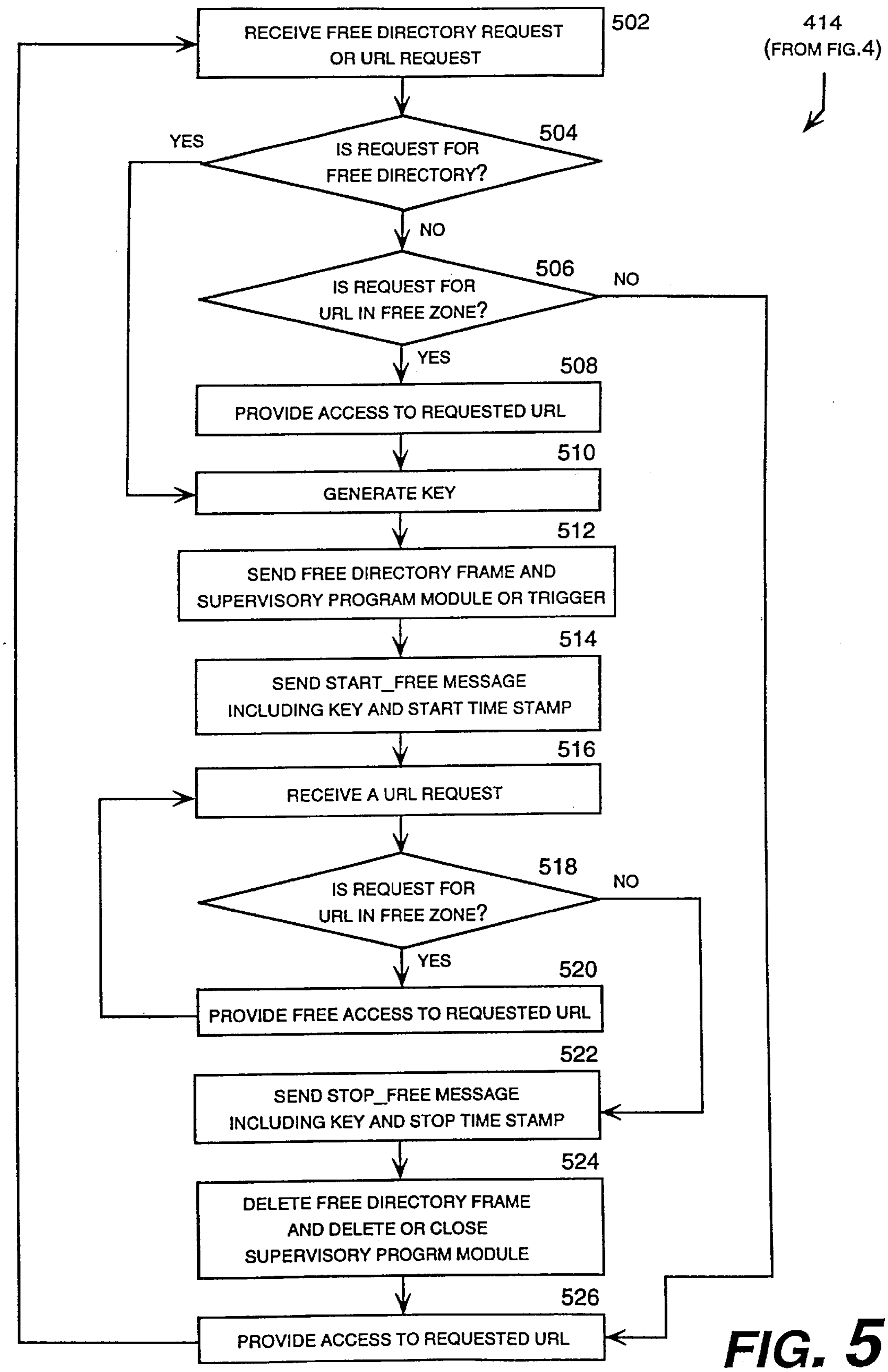
FIG. 5 is a logic flow diagram illustrating a method for providing an end-user with Internet access and monitoring the duration of connection between an end-user and an Internet site in accordance with the preferred embodiment of the present invention.

FIG. 5 is a logic flow diagram illustrating a method for providing an end-user with Internet access and monitoring the duration of connection between an end-user and an Internet site. The logic flow diagram of FIG. 5 further describes routine 414 shown on FIG. 4. The process illustrated by FIG. 5 is terminated when the communication between the end-user station 24 and the point of presence 22 is disconnected, indicated by the "YES" branch from step 416 of FIG. 4. It should be understood that the communication may be disconnected at any time during the operation of the routine illustrated by FIG. 5.

Turning now to FIG. 5, and also referring to FIGS. 2 and 3, in step 502 the terminal server/router 34 receives a request for the free directory 62 (i.e., selection of the free button 68 in the tool bar 66) or a URL request from the end-user station 24. In step 504, it is determined whether this request is for the free directory 62. If so, the "YES" branch is followed from step 504 to step 510. If the request is not for the free directory 62, the "NO" branch is followed from step 504 to decision step 506 in which it is determined whether the request is for a URL corresponding to an Internet site in the free zone. If the URL is for an Internet site in the free zone, the "YES" branch is followed to step 508 in which the terminal server/router 34 routes the communication to the free Internet site indicated by the URL request.

In step 510, the credit server 42 generates a key. In step 512, the key and the frame 59, which includes the free directory 62, are transmitted to the end-user station 24. In addition, a supervisory program module 58 is activated on the end-user station 24. The supervisory program module 58 is activated either by transmitting to the end-user station 24 the supervisory program module 58, or by transmitting a trigger to the end-user station 24 that activates a supervisory program module already resident on the end-user station 24.

In step 514, the supervisory program module 58 transmits a start_free message from the end-user station 24 to the credit server 42. The start_free message includes the key previously generated by the credit server 42 and a time stamp based on a clock 51 controlled by the end-user station 24. The credit server 42 generates a second time stamp based on a proprietary clock 48 controlled by the point of presence 22. The credit server 42 stores the contents of the start_free message and the second-time stamp in the credit log 44. The supervisory program module 58 may also periodically transmit status messages, the contents of which are also stored in the credit log 44.

In step 516, the terminal server/router 34 receives a URL request from the end-user station 24. In decision step 518, it is determined whether the requested URL is associated with an Internet site in the free zone. If the requested URL is associated with an Internet site in the free zone, the "YES" branch is followed from step 518 to step 520 in which the terminal server/router 34 routes the communication to the requested Internet site. Step 520 is followed by 516 in which the end-user requests another URL. The process illustrated by FIG. 5 loops through steps 516 through 520 as long as the end-user surfs among the Internet sites in the free zone.

Referring again to decision step 518, if the requested URL is not associated with an Internet site in the free zone, the end-user has surfed to the pay zone. The "NO" branch is therefore followed from step 518 to step 522 in which the supervisory program module 58 transmits a stop_free message to the credit server 42. The stop_free message includes the key previously generated by the credit server 42 and a time stamp based on a clock 51 controlled by the end-user station 24. The credit server 42 generates a second time stamp based on a proprietary clock 48 controlled by the point of presence 22. The credit server 42 stores the contents of the stop_free message and the second-time stamp in the credit log 44. In step 524, the free directory 62 is deleted and the supervisory program module 58 is deactivated.

Referring again to decision step 506, if the requested URL is not associated with an Internet site in the free zone, the end-user has surfed directly to an Internet site in the pay zone without first accessing the free directory 62 or an Internet site in the free zone. Thus, the "NO" branch from step 506 is followed to step 526 in which the terminal server/router 34 routes the communication to the requested Internet site in the pay zone. Likewise, step 524 is followed to step 526. Step 526 is followed by step 502, in which the end-user requests the free directory 62 by selecting the free button 68, or the end-user transmits another URL request. The process illustrated by FIG. 5 loops through steps 502 through 526 until the communication is disconnected (FIG. 4 step 416).

Figure 6:
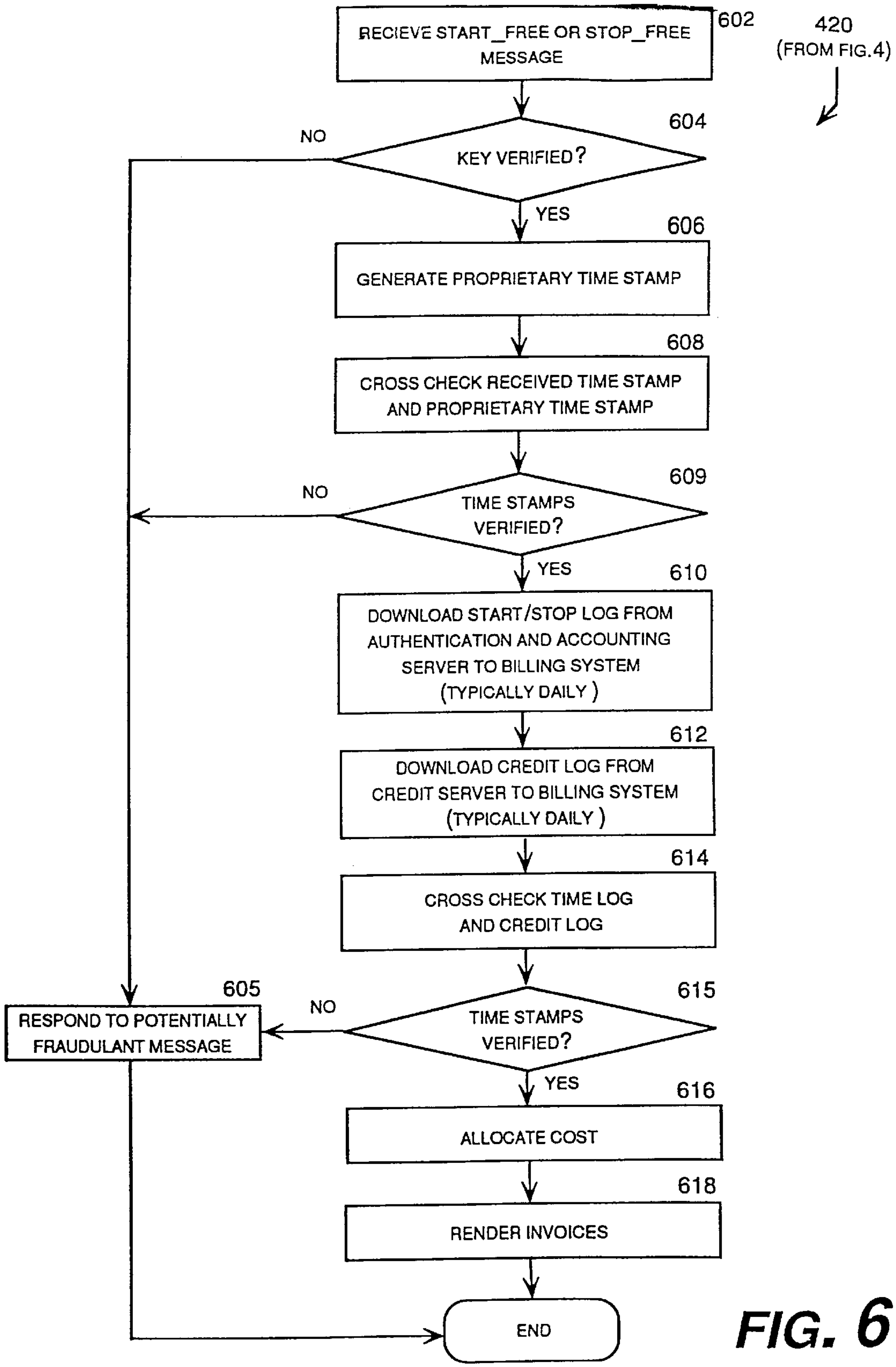
FIG. 6 is a logic flow diagram illustrating a method for allocating a cost associated with Internet access among the accessing end-user and Internet sites accessed by the end-user in accordance with the preferred embodiment of the present invention.

FIG. 6 is a logic flow diagram illustrating a method for allocating a cost associated with Internet access among the accessing end-user and Internet sites accessed by the end-user. The logic flow diagram of FIG. 6 further describes routine 420 shown on FIG. 4. Turning now to FIG. 6, and also referring to FIGS. 2 and 3, in step 602 the credit server 42 receives a start_free or a stop_free message from the supervisory program module 58 residing on the end-user station 24. In decision step 604, the credit server 42 verifies that the received message includes the correct key in step 604. If the received message does not includes the correct key, the "NO" branch is followed to step 605 in which the point of presence 22 responds to a potentially fraudulent message. For example, the communication may be disconnected, the end-user may be allocated the entire cost of the communication, additional security measures may be activated, information may be stored relative to the message, a message may be transmitted to the end-user station 24, authorities may be notified, or other measures may be taken. The steps taken in step 605 may depend on many factors, such as the past history of communications from the end-user station 24. Step 605 may therefore be followed by the "END" step as shown in FIG. 6, or it may be followed by another step, such as step 606.

If the key is verified in step 604, the "YES" branch is followed to step 606, in which the credit server 42 generates a second time stamp based on a proprietary clock 48 controlled by the point of presence 22. The credit server 42 stores the contents of the message and the second-time stamp in the credit log 44. In step 608, the time stamp received in the message and the time stamp generated by the credit server 42 are cross-checked with each other. It will be appreciated that these time stamps may also be cross-checked with other time stamps associated with the communication or the end-user station 24, such as the time stamp generated by the authentication and accounting server 38 upon login. In decision step 609, it is determined whether the time stamp is valid. If this analysis reveals tampering, the "NO" branch is followed from step 609 to step 605 in which the point of presence 22 responds to a potentially fraudulent message, as discussed previously.

If the time stamps are verified in step 609, the "YES" branch is followed to step 610 and 612, in which the start/stop log 40 and the credit log 44, respectively, are downloaded to the billing system 46. The authentication and accounting server time stamps and the credit server time stamps are then cross-checked in step 614. In decision step 615, it is determined whether the time stamps are valid. Again, if this analysis reveals tampering, he "NO" branch is followed from step 615 to step 605 in which the point of presence 22 responds to a potentially fraudulent message, as discussed previously. Further analysis of the data may be conducted to verify the authenticity of the data in the logs.

If the time stamps are verified in step 615, the "YES" branch is followed to step 616 in which costs are allocated, and step 618 in which invoices are rendered. The procedures associated with implementing allocation methodologies and rendering invoices are well known to those skilled in the art and therefore will not be further described herein.

In the manner described above, the present invention provides a method and system for providing an end-user with Internet access and allocating a cost associated with that access among the end-user and Internet sites accessed by the end-user. It should be understood that the foregoing relates only to specific embodiments of the present invention, and that numerous changes may be made therein without departing from the spirit and scope of the invention as defined by the following claims.

What is claimed is:

1. A method for providing an originating station with access to a distributed computing network, comprising the steps of:

receiving a communication including a request for access to the distributed computing network from the originating station;

determining the duration of the communication;

routing the communication to provide the network access, including a connection between the originating station and a monitored network site on the distributed computing network;

determining the duration of the connection by activating a supervisory program module residing on the originating station, the supervisory program module operative to transmit a message indicating the duration of the connection; and allocating a cost associated with the communication between a first account associated with the monitored network site and a second account associated with the originating station based on the duration of the communication and the duration of the connection.

2. The method of claim 1, wherein the connection between the originating station and the monitored network site is a first connection and wherein the step of routing the communication to provide the network access further comprises a second connection between the originating station and a second network site.

3. The method of claim 1, wherein the step of activating the supervisory program module comprises transmitting the supervisory program module to the originating station.

4. The method of claim 3, wherein the supervisory program module comprises a portable capsule of object-oriented architecture-neutral software code and related data.

5. The method of claim 1, wherein the step of activating the supervisory program module comprises transmitting a trigger to the originating station to activate the supervisory program module.

6. The method of claim 1, further comprising the steps of:

transmitting a directory to the originating station, the directory comprising an item corresponding to the monitored network site; and receiving a command from the originating station selecting the item.

7. The method of claim 6, further comprising the step of:

displaying the item on a display screen coupled to the originating station; and receiving a user command from the originating station selecting the item.

8. A method for providing an originating station with access to a distributed computing network, comprising the steps of:

receiving a communication including a request for access to the distributed computing network from the originating station;

determining the duration of the communication;

routing the communication to provide the network access; and in response to receiving a command requesting a connection between the originating station and a monitored network site on the distributed computing network, assigning a key to identify the communication;

transmitting the key to the originating station;

activating a supervisory program module residing on the originating station;

routing the communication to provide the connection between the originating station and the monitored network site;

receiving a message from the supervisory program module indicating the duration of the connection; and if the message includes the key, allocating a cost associated with the communication between a first account associated with the monitored network site and a second account associated with the originating station based on the duration of the communication and the duration of the connection.

9. The method of claim 8, wherein the step of assigning a key comprises generating a random number for use as a unique identifier for the communication.

10. The method of claim 9, further comprising the steps of:

in response to receiving the user command requesting a connection between the originating station and the monitored network site, transmitting a directory to the originating station, the directory comprising an item corresponding to the monitored network site; and displaying the item on a display screen coupled to the originating station.

11. A method for providing an originating station with access to a distributed computing network, comprising the steps of:

receiving a communication including a request for the access from the originating station;

determining the duration of the communication;

in response to receiving a user command requesting a directory comprising items corresponding to monitored network sites on the distributed computing network, assigning a key to the communication;

transmitting the key to the originating station;

activating a supervisory program residing on the originating station; and displaying the items on a display device coupled to the originating station; and in response to receiving a user command selecting one of the items, routing the communication to provide the access, including a connection between the originating station and one of the monitored network sites corresponding to the selected item;

receiving a message from the supervisory program module indicating the duration of the connection; and if the message includes the key, allocating a cost associated with the communication between a first account associated with the monitored network site corresponding to the selected item and a second account associated with the originating station based on the duration of the communication and the duration of the connection.

12. A method for providing an originating station with access to a distributed computing network, comprising the steps of:

receiving a communication including a request for the access from the originating station;

determining the duration of the communication;

activating a supervisory program module residing on the originating station;

routing the communication to provide the access, including a connection between the originating station and a monitored network site on the distributed computing network;

receiving a first message including a first start time stamp from the supervisory program module indicating the beginning of the connection;

in response to receiving the first message, generating a second start time stamp;

receiving a second message including a first stop time stamp indicating the end of the connection;

in response to receiving the second message, generating a second stop time stamp;

computing a first monitored duration based on a difference between the first stop time stamp and the first start time stamp;

computing a second monitored duration based on a difference between the second stop time stamp and the second start time stamp; and if the first monitored duration is approximately equal to the second monitored duration, allocating a cost associated with the communication between a first account associated with the monitored network site and a second account associated with the originating station based on the duration of the communication and the duration of the connection.

13. The method of claim 12, wherein the first start time stamp comprises a start time defined by a clock controlled by the originating station, and wherein the first start time stamp may be used to verify the authenticity of the message.

14. The method of claim 13, wherein the second start time stamp comprises a start time defined by a proprietary clock, and wherein the second start time stamp may be used to verify the authenticity of the message.

15. In a distributed computing network comprising a plurality of network sites, a point of presence, and a backbone communications network interconnecting the network sites and the point of presence, a method for providing an originating station with access to the distributed computing network, comprising the steps of:

receiving a communication including a request for the access at the point of presence from the originating station;

determining the duration of the communication;

in response to receiving a user command requesting a directory comprising an item corresponding to a monitored network site on the distributed computing network, assigning a key to the communication;

transmitting the key and the directory from the point of presence to the originating station;

activating a supervisory program module residing on the originating station; and displaying the item on a display device coupled to the originating station;

in response to a user command selecting the item, routing the communication over the backbone communications network to provide the access, including a connection between the originating station and the monitored network site;

receiving a first message from the supervisory program module indicating the beginning of the connection, the first message including a first start time stamp;

in response to receiving the first message, generating a second start time stamp;

receiving a second message indicating the end of the connection, the second message including a first stop time stamp;

in response to receiving the second message, generating a second stop time stamp;

computing a first monitored duration based on a difference between the first stop time stamp and the first start time stamp;

computing a second monitored duration based on a difference between the second stop time stamp and the second start time stamp; and if the first monitored duration is approximately equal to the second monitored duration, and the first and second messages include the key, allocating a cost associated with the communication between a first account associated with the monitored network site and a second account associated with the originating station based on the duration of the communication and the duration of the connection.

16. The method of claim 15, wherein the connection between the originating station and the monitored network site is a first connection and wherein the step of routing the communication over the backbone communications network to provide the access further comprises a second connection between the originating station and a second network site.

17. A method for allocating cost associated with a communication over a distributed computing network comprising the steps of:

receiving a communication including a request for access to the distributed computing network from an originating station;

determining the duration of the communication;

displaying a directory comprising an item corresponding to a monitored network site on the distributed computing network;

detecting a command selecting the item;

activating a supervisory program module resident within a memory storage device of the originating station;

the supervisory program module determining the duration of a connection between the originating station and the monitored network site;

the supervisory program module transmitting a message to a remote point of presence within the distributed computing network indicating the duration of the connection; and allocating a cost associated with the communication between a first account associated with the monitored network site and a second account associated with the originating station based on the duration of the communication and the duration of the connection.

18. The method of claim 17, wherein the supervisory program module is operable for residing within a memory storage device of the originating station after the supervisory program module has been transmitted to the originating station.

19. The method of claim 17, wherein the supervisory program module resides within a memory storage device of the originating station and activates in response to a trigger transmitted to the originating station.

20. The method of claim 17, wherein the supervisory program module comprises further instructions which, when executed by the originating station, perform the steps of:

receiving a key comprising a unique identifier for the communication assigned by the point of presence for authenticating the message; and including the key in the message.

21. The method of claim 17, wherein the supervisory program module comprises further instructions which, when executed by the originating station, perform the steps of:

in response to a user command selecting the item, generating a time stamp for verifying the authenticity of the message comprising a reading of a clock controlled by the originating station; and including the time stamp in the message.

22. A point of presence for accessing a distributed processing network comprising:

a receiver for receiving a communication from an originating station;

a terminal server/router, coupled to the receiver, for routing the communication to provide the originating station with access to the distributed computing network, including a connection between the originating station and a monitored network site on the distributed computing network;

an authentication and accounting server, coupled to the terminal server/router, for determining the duration of the communication;

a credit server, coupled to the terminal server/router, for determining the duration of the connection with the monitored network site;

a billing system, coupled to the authentication and accounting server and to the credit server, for allocating a cost associated with the communication between a first account associated with the monitored network site and a second account associated with the originating station based on the duration of the communication and the duration of the connection; and means for activating a supervisory program module operable for transmitting a message from the originating station of the point of presence indicating the duration of the connection.

23. The point of presence of claim 22, further comprising means for transmitting a supervisory program module to the originating station via a communications network, the supervisory program module operable for transmitting a message from the originating station to the point of presence indicating the duration of the connection.

24. The point of presence of claim 22, further comprising means for transmitting a trigger via a communications network for activating a supervisory program module residing on the originating station, the supervisory program module operable for transmitting a message from the originating station to the point of presence indicating the duration of the connection.

25. The point of presence of claim 22, further comprising means for transmitting a directory comprising an item corresponding to the monitored network site to the originating station, and for receiving from the originating station a command selecting the item.

26. The point of presence of claim 22, further comprising means for assigning a key to the communication, for transmitting the key to the originating station, and for determining whether a message indicating the duration of the communication received from the originating station includes the key.

27. The point of presence of claim 26, further comprising means for receiving a first time stamp in the message, for generating a second time stamp based on a proprietary clock, and for determining whether the first time stamp corresponds to the second time stamp.

* * * * *